June 24, 1930. F. J. GOUGH ET AL 1,767,791
MIXER FOR STUCCO COMPOSITIONS
Filed Nov. 1, 1928
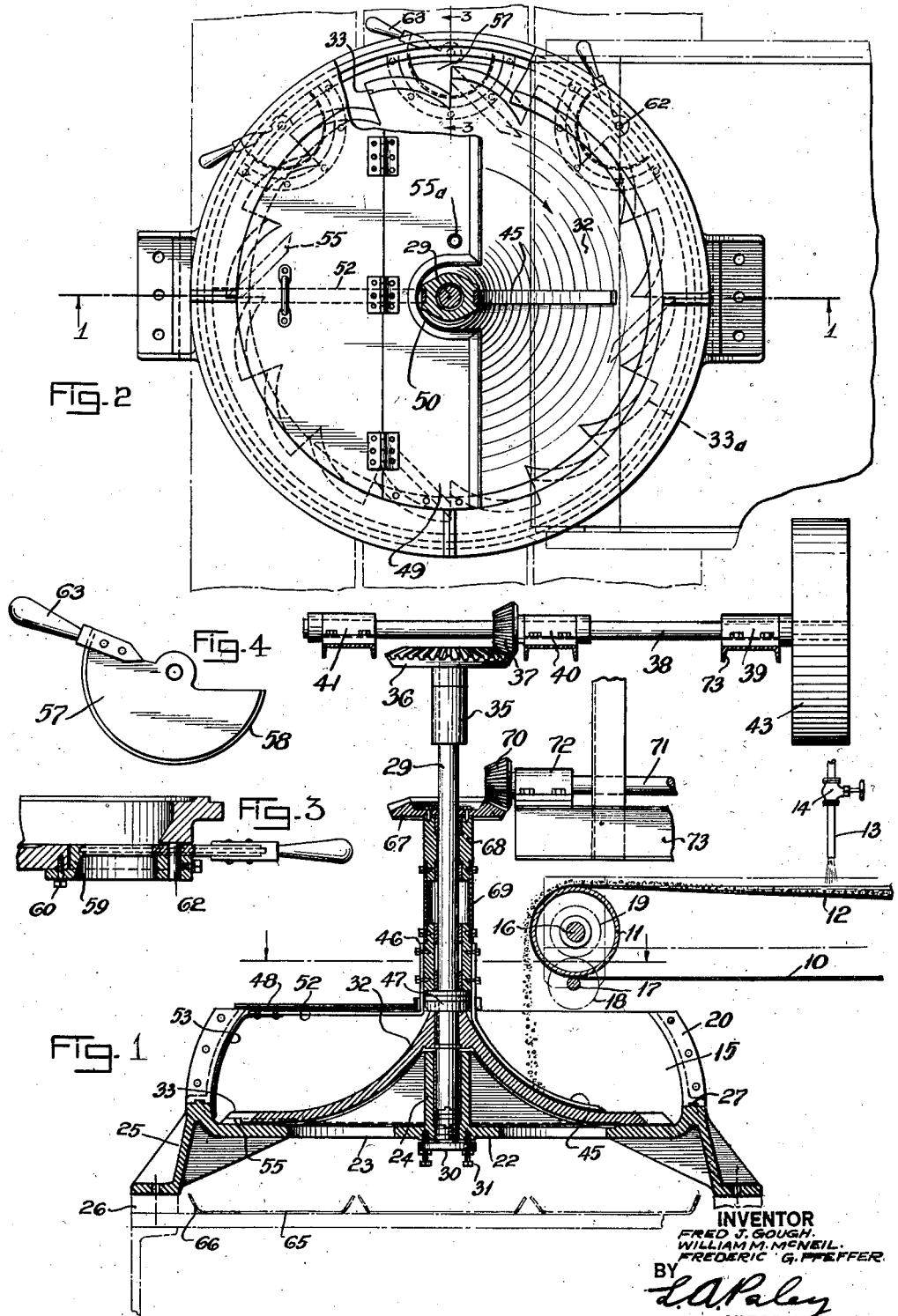
INVENTOR
FRED J. GOUGH.
WILLIAM M. MCNEIL.
FREDERIC G. PFEFFER.
BY
ATTORNEY Patented June 24, 1930

1,767,791

UNITED STATES PATENT OFFICE

FRED J. GOUGH, OF FORT DODGE, IOWA, WILLIAM M. McNEIL, OF CHICAGO, ILLINOIS, AND FREDERIC D. PFEFFER, OF FORT DODGE, IOWA, ASSIGNORS TO UNITED STATES GYPSUM COMPANY, OF CHICAGO, ILLINOIS, A CORPORATION OF ILLINOIS

MIXER FOR STUCCO COMPOSITIONS

Application filed November 1, 1928. Serial No. 316,410.

This invention relates to an apparatus for mixing stucco or other cementitious compositions with water.

In the manufacture of plasterboard, tile, and other gypsum products, it is necessary to mix a composition containing plaster of Paris or other calcined gypsum with water, the setting time of the gypsum being so controlled by means of accelerators, that a very rapid setting occurs. It is often found desirable to introduce foam and various fibers into the composition before mixing so as to control the properties of the resulting product. Because of the rapid setting of the composition, it is difficult to design a satisfactory mixer because of the fact that the stucco tends to accumulate upon inactive surfaces of the mixer and eventually stop up the action thereof so as to make it necessary to shut down the mixer for cleaning. It is also necessary to have a mixer which will thoroughly incorporate the water with the stucco composition in a very short period of time before setting begins.

An object of this invention, therefore, is to provide an improved apparatus for mixing whereby the water is thoroughly incorporated with the stucco composition.

Another object of the invention is to provide an improved mixer which will not permit stucco to set upon inactive surfaces and thus stop the action of the mixer.

A further object of the invention is to provide a mixer which will rapidly incorporate the water with the stucco and deliver the stucco to the point of discharge before the setting of the stucco takes place; also to improve methods of mixing and apparatus therefor in other respects hereinafter specified and claimed.

Reference is to be had to the accompanying drawings forming a part of this specification, in which Fig. 1 is a sectional elevation through the improved mixing apparatus on the line 1—1 of Fig. 2, Fig. 2 is a sectional plan view of the mixing apparatus, Fig. 3 is a sectional elevation through one of the outlet gates of the mixing apparatus and Fig. 4 is a plan view of one of the outlet gates.

The stucco composition to be mixed with water, is introduced onto a belt 10 which is allowed to sag near its delivery pulley 11 to form a pocket 12. Water is introduced into the pocket 12 through a pipe 13 controlled by valve 14 so that this water accumulates in said pocket. The stucco composition is soaked and moistened by the water in the pocket 12 and then is conveyed upwardly above the water level to then pass over the pulley 11 and drop into the mixer bowl 15. The pulley 11 is secured to a shaft 16 which is rotatably mounted and driven by the belt 10 which in turn is driven by a driven pulley at the opposite end of said conveyor. A shaft 17 is rotatably mounted below the pulley 11 so as to contact with the belt 10, said shaft 17 being driven by a gear 18 which meshes with a gear 19 secured to the shaft 16. The shaft 17 rotates slowly in contact with belt 10 so as to prevent any wet material from passing around the pulley 11 under the lower reach of the belt 10 without permitting any stucco to set on the shaft 17, and so as to insure that all of the material drops into the mixing bowl 15.

The mixing bowl 15 is preferably rather shallow and the side thereof is arcuate in cross section, as shown in Fig. 1. The mixing bowl 15 is preferably constructed in sections, each section being provided with flanges 20 which are bolted together so that the sections of said bowl can be easily disassembled for cleaning or repairing if necessary, without disturbing the rest of the mixer mechanism. The bottom 22 of the mixer bowl is preferably provided with suitable openings 23 so that no stucco can accumulate adjacent a central bearing 24 formed in the bowl bottom 22. Suitable brackets or legs 25 are preferably cast integral with the bowl bottom 22 so that the mixer may be supported on a suitable framework 26 by said legs. An annular tongue 27 is formed on the bottom 22 adjacent the periphery thereof, said tongue engaging in a similarly shaped slot formed in the bowl sections 15.

A central vertical shaft 29 is rotatably mounted adjacent its lower end in the bearing 24, a thrust bearing 30 for said shaft being secured by bolts 31 to the lower face of the bowl bottom 22. A rotor 32 is secured near the bottom of shaft 29, said rotor having curved, frusto-conical faces upon which the moistened stucco composition falls for mixing. Teeth 33 with cutting edges 33ᵃ are formed around the periphery of the rotor 32, these teeth serving to stir up the material in the mixer and accomplish the thorough mixing thereof. The upper end of shaft 29 is rotatably mounted in a bearing 35 suitably supported on framework. A bevel gear 36 is secured to the upper end of shaft 29, said gear meshing with a bevel pinion 37 secured to a substantially horizontally extending shaft 38, the latter being rotatably mounted in bearings 39, 40 and 41 mounted on the framework of the machine. The shaft 38 is driven in any suitable way, such as by a pulley 43 connected by a belt to any source of power such as a motor, not shown.

One of the major problems in the mixing of quick setting cementitious materials such as stucco, is the prevention of the accumulation of the stucco upon inactive surfaces of the mixer. If the stucco is allowed to set upon inactive surfaces, it soon builds up and necessitates a shut down of the mixer for cleaning. One of the important advantages of our mixer is that thorough scraping and cleaning of all surfaces in contact with the stucco is maintained at all times. The scraping mechanism is composed of an arcuate scraper 45 which bears against the curved surface of the rotor 32, said scraper being in the form of a flat piece of steel which is secured at the upper end to a sleeve 46, said sleeve being rotatably supported on a collar 47 secured to the shaft 29. A cover 48 is provided over a little more than half of the top of the mixing bowl 15 to prevent loss of material by splashing, a lid 49 of said cover being hingedly secured to said cover and being provided with an opening 50 to partially enclose the collar 47. The lid 49 may be swung upwardly upon its hinges for inspection and cleaning purposes. A second scraper 52 is secured to the sleeve 46, said scraper 52 being preferably arranged diametrically opposite the scraper 45 and having a downwardly extending arcuate arm or scraper 53 attached thereto, which engages the curved inner surface of the mixing bowl 15 to maintain said surface clean at all times. In order to prevent the accumulation of set stucco between the rotor 32 and the bottom of the bowl 22, we provide a series of scrapers 55, preferably embedded in the bottom of the rotor 32 adjacent the teeth 33, said scrapers 55 being spaced only a slight distance above the upper surface of the mixer bottom 22. A water inlet 55ᵃ is provided in the cover 48 for use for cleaning or when additional water is needed for the composition.

Another important provision in our mixer is the gates which are so designed as to prevent any stucco from setting thereon and thus stopping the action of the mixer. Our improved gates are in the form of a semicircular flat disc 57 as seen in Fig. 4, the outer periphery of said disc being provided with an annular tongue 58, which is adapted to slide in a similarly shaped annular groove formed in a gate bracket 59, the latter being secured by cap screws 60 to the lower face of the mixer bottom 22. The gate plate 57 is pivoted on a pin 62 in the center of said plate, and a handle 63 is provided on the plate for operating same. It is seen that the upper face of the gate plate 57 is flush with the upper surface of the mixer bottom 22 so that the upper surface of said gate plate is continually scraped and kept clean by the rotor teeth 33 during the rotation of said rotor 32.

We preferably provide three of the gates in the bottom of the mixer bowl 15 so that each gate delivers to a moving sheet of paper 65 which forms one face of the finished wallboard which may be made through the use of our improved mixer. The edges 66 of said sheet of paper are bent upwardly so as to form a trough for the reception of the mixed stucco. It should be understood that any number of moving strips of paper 65 and corresponding gates in the mixer may be used if desired.

In order to cause the rotation of the scraping devices 45, 52 and 53, we provide a bevel gear 67 which is rotatably mounted on the shaft 29, the hub 68 of said gear being elongated and connected by a sleeve 69 to the sleeve 46 to form a driving connection between the gear 67 and sleeve 46. A bevel pinion 70 meshes with the gear 67, said pinion being secured on a shaft 71 which is rotatably mounted in one or more bearings 72, secured to the framework 73 of the machine. Any suitable motive power may be used to cause the continuous rotation of the shaft 71 and scrapers 45, 52, and 53. It is preferable that the scrapers move in the same direction as the rotor but at a lower speed so that relative movement between said scrapers and rotor takes place. Thus in practice it is found convenient to run the rotor at a speed of 100 R. P. M. and to run the scrapers at a speed of 25 R. P. M. The rotor speed, however, may be varied between the limits of 90 R. P. M. to 150 R. P. M. while the scraper speed may be varied from 5 R. P. M. to 40 R. P. M. It should be understood, however, that the scrapers may be rotated in a direction opposite to that of the rotor if so desired.

We would state in conclusion that while the illustrated example constitutes a practical embodiment of our invention, we do not limit ourselves precisely to these details since manifestly the same can be considerably varied without departing from the spirit of the invention as defined in the appended claims.

Having thus described our invention we claim as new and desire to secure by Letters Patent:—

1. In a mixing device, a mixing container, a rotor having mixing surfaces, said rotor being rotatably mounted in said container, and scraping means closely adjacent to said rotor and adapted for scraping movement over said surfaces of said rotor.

2. In a mixing device, a mixing container, a rotor rotatably mounted in said container, scraping means contacting with the surface of said rotor and also contacting with the walls of said container, and means for imparting rotary motion to said scraping means relative to said rotor and container.

3. In a mixing device, a mixing container, means for depositing a moistened material into said container, a mixing rotor rotatably mounted in said container and adapted to mix said material, scraping means adapted to prevent the setting of the said material on said rotor and walls of said container, and means for discharging said mixed material from said container.

4. In a mixing device, a conveyor belt formed into a pocket, means for admitting water into said pocket, said conveyor belt being adapted to continuously move materials to be moistened and mixed through the water in said pocket, and discharge said moistened material from said belt, a mixing container adapted to receive the moistened material from said belt, a mixing rotor rotatably mounted in said container, and means for discharging the mixed material from said container.

5. In a mixing device, a mixing container, a shaft rotatably mounted substantially concentrically to said container, a mixing rotor secured to said shaft, a sleeve rotatably mounted on said shaft, a scraping device secured to said sleeve and adapted to scrape the surface of said rotor, means for imparting relative movement to said scraper and rotor and means for discharging the mixed material from said container.

6. In a mixing device, a mixing container, a shaft rotatably mounted adjacent said container, a rotor having curved frusto-conical surfaces and teeth around the periphery thereof, means for rotating said rotor so as to accomplish the mixing of material introduced into said container, scraping means assoicated with said rotor adapted to prevent the setting up of material inside of said container, and means for discharging the mixed material from said container.

7. In a mixing device, a mixing container, a cover over a portion of the top of said container, means for introducing material to be mixed into said container through the top of said container not covered by said cover, a rotor in said container adapted to mix said material, scraping means adapted to prevent the setting of material on said cover, and means for discharging the mixed material from said container.

8. In a mixing device, a mixing container, means for introducing moistened material into said container, a rotor adapted to rotate in said container and mix said material, scraping means adapted to rotate in contact with substantially all of the active surfaces inside said container, and means for discharging the material from said container.

9. In a mixing device, a mixing container, a shaft rotatably mounted in said container, means for rotating said shaft at one speed, a mixing rotor secured to said shaft, scraping means rotatably mounted in said container, means for rotating said scraping means in contact with said rotor at a speed different from the speed of said rotor, and means for discharging mixed material from said container.

10. A mixing device comprising a mixing container, a rotor adapted to nearly contact with the bottom of said container, and a discharge gate having its upper surface substantially flush with the bottom of said container so as to be scraped continuously by said rotor to prevent the setting of material on said gate.

11. In a mixing device, a mixing container, a rotor adapted to rotate inside of said container adjacent the bottom thereof, a semi-circular gate rotatably mounted so as to permit the discharge of mixed material from an opening in the bottom of said container, said gate being so positioned as to be continually cleaned by said rotor.

12. In a mixing device, a mixing container having a cover, a mixing rotor rotatably mounted in said container, means for introducing a moistened material into said container, means for adding additional liquid into said container, scraping means adapted to prevent the setting of material upon the active surfaces in said container and cover, and means for discharging the mixed material from said container.

13. In a mixing device, a mixing container, means for introducing a material to be mixed into said container, a plurality of mixing devices rotatably mounted in said container and in scraping contact one with the other, means for rotating said mixing devices in the same direction but at different speeds, and means for discharging the mixed material from said container.

14. In soaking and mixing device, a conveyor belt having a pocket, means for introducing water into said pocket, said belt being adapted to move material to be soaked through the water in said pocket and discharge said moistened material from said belt, rotating means adapted to engage the lower surface of said belt and prevent the adherence of moistened material to said belt at a predetermined point, a mixing container adapted to receive said moistened material, a mixing rotor in said container, and means for discharging the mixed material from said container.

15. In a mixing device, a mixing container, means for introducing moistened material to be mixed into said container, a rotor rotatably mounted in said container, scraping means adapted to move over the surface of said rotor, additional scraping means adapted to move over the surface of said container, and means for discharging the mixed material from said container.

16. A device for mixing quick-setting cementitious compositions, comprising a container, an agitating device rotatably mounted in said container, and rotatably mounted scraping means for scraping substantially all of the active surfaces of said agitating device and container.

FRED J. GOUGH.
WILLIAM M. McNEIL.
FREDERIC D. PFEFFER.